Feb. 2, 1965   A. B. BROERMAN ETAL   3,167,946
CHROMATOGRAPHIC METHOD AND APPARATUS
Filed May 22, 1961
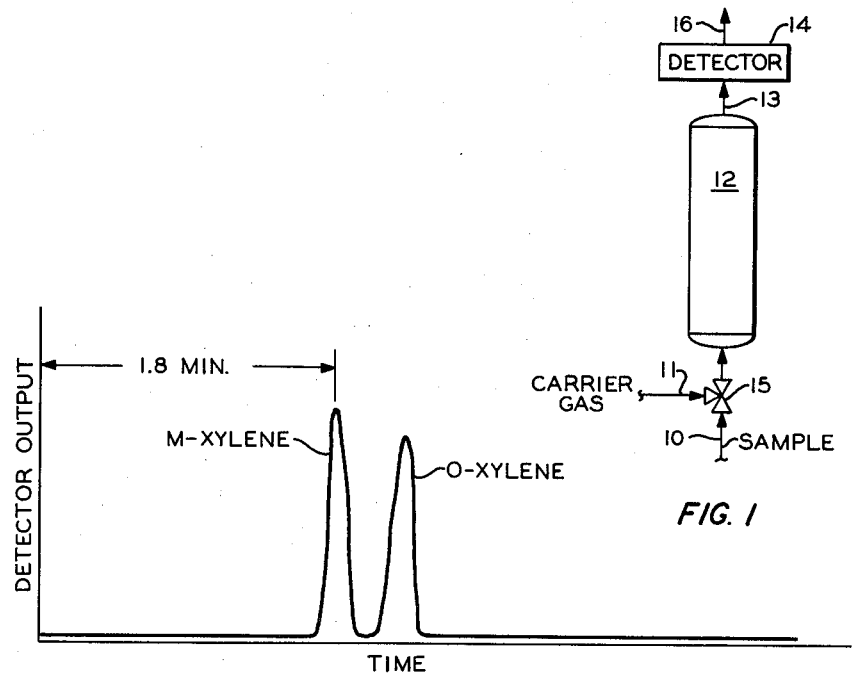
FIG. 1
FIG. 2
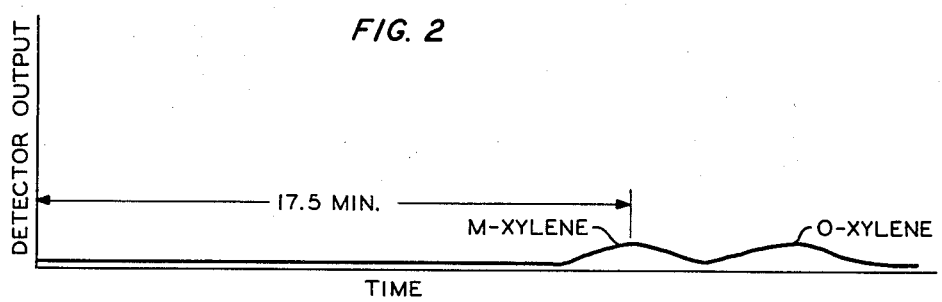
FIG. 3
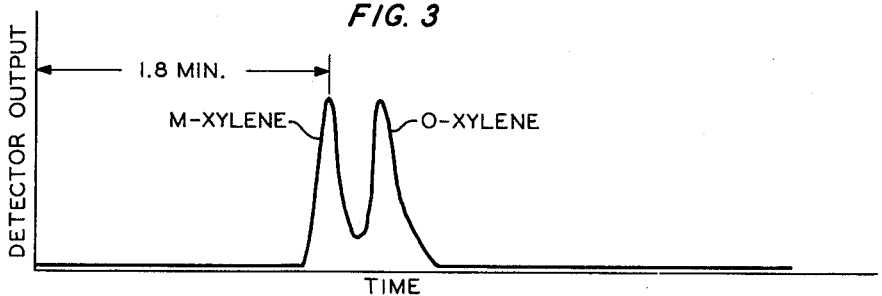
FIG. 4
INVENTORS.
A. B. BROERMAN
B. O. AYERS
BY Hudson + Young
ATTORNEYS

3,167,946
CHROMATOGRAPHIC METHOD AND APPARATUS

Arthur B. Broerman and Buell O. Ayers, Bartlesville, Okla., assignors to Phillips Petroleum Company, a corporation of Delaware
Filed May 22, 1961, Ser. No. 125,300
6 Claims. (Cl. 73—23.1)

This invention relates to an improved method of and apparatus for analyzing vaporous mixtures.

A method of measuring the concentration of constituents of a fluid mixture involves the use of a chromatographic analyzer. In chromatography, a vapor sample of the mixture to be analyzed is introduced into a column containing a selective sorbent or partitioning material. This results in the several constituents of the sample mixture flowing through the column at different rates of speed, depending upon their affinities for the packing material. The column effluent thus consists initially of carrier gas alone, the individual constituents of the sample mixture appearing later at spaced time intervals. A conventional method of detecting the presence and concentration of these constituents is to employ a thermal conductivity detector which compares the thermal conductivity of the effluent gas with the thermal conductivity of the carrier gas directed to the column.

When a liquid is employed as a partitioning material, the liquid is supported by a packing material. Conventionally, it is desirable that this packing material be inert in the presence of the partitioning liquid and the sample mixture. Necessarily, in order to effectively resolve the constituents of the sample mixture, the partitioning liquid must be uniformly distributed over the packing material.

Accordingly, an object of this invention is to provide an improved method of and apparatus for analyzing vaporous mixtures.

Another object of this invention is to provide an improved method of and apparatus for chromatographically analyzing vaporous mixtures wherein a partitioning liquid is employed to resolve the constituents of said vaporous mixtures.

Another object of this invention is to provide an improved method of and apparatus for chromatographically analyzing vaporous mixtures wherein a liquid employed as a partitioning agent is supported by an improved inert packing material.

Other objects, advantages, and features of our invention will be readily apparent to those skilled in the art from the following description and the appended claims.

We have discovered that when granules prepared from solid polyhalogenated hydrocarbon polymers such as Teflon (tetrafluoroethylene), polychlorotrifluoroethylene, trifluoronitrosomethane copolymers, and copolymers of fluoropropylene and tetrafluoroethylene are treated with a solution of an alkali metal in liquid ammonia and employed to support a partitioning liquid in a chromatographic column, the analysis of the vaporous sample mixture is improved.

In order to obtain a desired degree of resolution between two chromatographic peaks in a minimum time, it is necessary to hold the plate capacity $k_1$ of a column containing a partitioning liquid near a value of 3 for the sample constituents. The value of the plate capacity is provided by the following equation:

$$k_i = \frac{V_1}{V_g} K_i$$

where $V_1$ is the volume of liquid substrate per unit length of column; $V_g$ is the volume of gas phase per unit length of column; $K_i$ is the partition coefficient for the sample constituent $i$. For a particular sample constituent, the plate capacity can be established by choosing a partitioning liquid having a specified partition coefficient for the sample constituent at the operating temperature and by adjusting the volume of the partitioning liquid per unit length of column. With a given weight percent of liquid substrate and hence of $V_1$, the values of $K_i$ and $k_i$ increase in general with the increasing molecular weight of the sample constituents.

If an attempt is made to decrease $k_i$ by decreasing the percent of liquid (and hence $V_1$) with conventional supports, such as crushed firebrick, surface effects become important and peak distortions occur. This is particularly true when polar constituents are present in the sample mixture passed to the chromatographic column.

By employing a packing material consisting of treated particles prepared from polyhalogenated hydrocarbon polymers, a relatively small quantity of partitioning liquid can be utilized with the liquid distributed as a film uniformly over the packing material. Materials such as sulfur dioxide, nitrogen dioxide and nitrogen oxide when passed to a chromatographic column containing a conventional packing material such as firebrick, are reactive with the packing material. These same materials are relatively inert with respect to the inventive treated packing material.

The process of treating the granules prepared from polyhalogenated hydrocarbon polymers, hereinafter described, provides a means of obtaining a packing material of uniform size, thus substantially increasing the efficiency of the chromatographic column by providing a more uniform surface area for the partitioning liquid. The efficiency of the chromatographic column can be further increased when said column consists of a tube prepared from a polyhalogenated hydrocarbon polymer treated in the same manner as the granules. In this way, the texture of the column walls and granules is identical so that a partitioning liquid covers the inner chromatographic column wall in the same manner as the granules.

FIGURE 1 is a schematic representation of a chromatographic analyzer employing the inventive packing material.

FIGURE 2 is a graphical representation of the effectiveness of the chromatographic analyzer of FIGURE 1.

FIGURES 3 and 4 are graphical representations of the effectiveness of conventional chromatographic analyzers.

Referring to FIGURE 1, there is shown a column 12 which contains a partitioning liquid on an inert support material consisting of treated granules prepared from a polyhalogenated hydrocarbon polymer or mixtures of said polymers. The granules are treated by contacting said granules with a solution of an alkali metal in liquid ammonia with solutions of sodium and potassium preferred. A suitable treating solution is a solution of sodium metal in ammonia distributed by the Joclin Manufacturing Company, Wallingford, Connecticut, under the trade name of FluoroBond. When a treating solution of sodium metal in ammonia is employed, the granules are contacted with the treating solution until discoloration of the granules occurs which is indicative of surface change. The length of the contact period will depend upon the concentration of the treating solution. When utilizing the FluoroBond solution to treat Teflon granules, a contact period in the range of 5–15 seconds is employed. As previously noted, column 12 can be fabricated from the same material as the granules and treated in the same manner as the inert packing material.

The treated granules are removed from the treating solution and washed with a solvent such as butyl alcohol to remove residual alkali metal remaining on the treated granules. The treated granules are then dried by conventional means.

Preferably the treated granules have a particle size in the range of 80 to 100 mesh although particle sizes as small as 150 mesh and as large as 30 mesh can be employed. The treated granules can be employed to support all partitioning liquids to include squalane, octadecane, silicones, high molecular weight ethers such as bis (α-methylbenzyl) ether, high molecular weight esters such as bis (2-ethoxyethyl) adipate, and high molecular weight nitriles.

Conventional methods of placing the partitioning liquid on the treated granules can be employed. A suitable method of combining the partitioning liquid and inert support is to dissolve the partitioning liquid in a solvent such as methylene chloride. The prepared solution is then added to the inert support material. The resulting slurry is then dried under a heat lamp and reactivated under a vacuum for 1–2 hours at a temperature slightly above the boiling point of the volatile solvent.

A vaporous fluid sample to be analyzed is introduced into the inlet of column 12 by means of a conduit 10 and a three-way control valve 15. A carrier gas such as helium is then introduced into column 12 by means of a conduit 11 and three-way valve 15. The effluent from column 12 passes by means of a conduit 13 to the inlet of a detector 14.

Detector 14 is adapted to measure a property of the fluid mixture directed thereto, which property is representative of the composition of the fluid mixture. Detector 14 can advantageously comprise a thermal conductivity analyzer which includes a temperature-sensitive resistance element disposed in the effluent gas flow. A reference element (not shown) can be disposed in the carrier gas flow to three-way valve 15. Such a detector provides signals representative of the difference of thermal conductivity between the column effluent and the carrier gas. Temperature differences between the resistance elements representative of the composition of the sample fluid mixture can be measured by electrical bridge circuits, such as a Wheatstone bridge. However, the detector can also be any other type of apparatus known in the art for measuring a property of the gaseous stream.

The three-way valve 15 can be operated by a timer, not herein illustrated. Such a timer provides output signals that operate a valve in the desired sequence. This timer can be any type of apparatus known in the art for providing the control signals in a desired sequence. One common type of timer which can be employed to advantage utilizes a series of cam operated switches wherein the associated cams are rotated by a timing motor.

Although a chromatographic method of analysis wherein a carrier gas is employed has herein been described, it is within the scope of this invention to employ the treated granules in an otherwise conventional frontal chromatographic analysis system.

Advantages and features of the inventive method of analysis are readily apparent when reference is made to the following specific analyses of a hydrocarbon mixture.

Example I

Column 12 is formed of six feet of 1/8 inch stainless steel tubing containing 3 percent by weight of Dow Corning Silicone No. 200 (polymer of alternate silicon and oxygen atoms) upon treated Teflon granules having a particle size of from 80 to 100 mesh. The Teflon granules are contacted with the silicone in a mechanical mixer so that the silicone is distributed evenly upon the granules. The Teflon granules are treated by contacting said Teflon granules with a FluoroBond treating solution of sodium metal in liquid ammonia for a period of 10 seconds.

Helium is employed as a carrier gas. 0.05 cc. of a vaporous fluid mixture comprised of o-xylene and m-xylene is passed to column 12. The carrier gas is then passed to column 12 at the rate of 40 cc. per minute. The column is operated at a temperature of 100° C. The concentration of the partitioning liquid on the Teflon granules has been adjusted so that the plate capacity of the column for m-xylene and o-xylene is 3.0 and 3.4, respectively. The resulting chromatograph is illustrated in FIGURE 2.

Example II

The same equipment is employed as in Example I. Again, an operating temperature of 100° C. and a linear carrier gas velocity and sample volume identical to the carrier gas velocity and sample volume of Example I are employed.

Column 12 contains Dow Corning Silicone No. 200 as a partitioning liquid on 60–80 mesh Chromosorb, a firebrick material manufactured by Johns-Manville for use in chromatographic analyzers. The concentration of the partitioning liquid based on the weight of the inert support is 10 percent. The plate capacities for m-xylene and o-xylene are 14.8 and 17.0 respectively. The resulting chromatograph is illustrated in FIGURE 3.

Example III

The equipment and operating conditions are identical with the equipment and operating conditions of Example I with the exception that the Teflon granules employed as the inert packing material are untreated. The result is illustrated in FIGURE 4.

In comparing FIGURES 2 and 4, it is noted that when untreated Teflon granules are employed as the support material, the chromatograph peaks are broadened thereby resulting in a loss in resolution. In comparing FIGURES 2 and 3, it is noted that the retention time for the sample constituents of FIGURE 2 is approximately 1/10 as long as for the sample constituents of FIGURE 3. The resolution in FIGURES 2 and 3 is nearly the same but the sensitivity, which is the height of the peak per unit weight of sample, is about 10 times as great in FIGURE 2 as in FIGURE 3.

The broadening of the peaks in FIGURE 4 with a loss in resolution is due to pockets of liquid forming within column 12. An attempt to reduce the plate capacity of column 12 to 3.0 and 3.4 in Example II will result in a retention time similar to the retention time in Example III. However, the surface effects would in this case lead to much worse tailing for both the m-xylene and o-xylene peaks than is evident in the chromatograph of Example III.

As will be evident to those skilled in the art, various modifications of this invention can be made or followed, in the light of the foregoing disclosure and discussion without departing from the spirit or scope thereof.

We claim:

1. A method of analyzing a fluid mixture which comprises introducing said fluid mixture as a vapor into the inlet of a zone containing a partitioning liquid on an inert support, whereby said liquid selectively retards the passage of said vaporous fluid mixture through said zone, said inert support comprising granules prepared from solid polyhalogenated hydrocarbon polymers treated by contacting said granules with a solution of an alkali metal in liquid ammonia, and measuring a property of the effluent from said zone which is representative of the composition thereof.

2. A method of analyzing a fluid mixture which comprises introducing said fluid mixture as a vapor into the inlet of a zone containing a partitioning liquid on an inert support, said inert support consisting essentially of Teflon granules treated with a solution of sodium metal in liquid ammonia, introducing a carrier gas into the inlet of said zone whereby said liquid selectively retards the passage of said vaporous fluid mixture through said zone, and measuring a property of the effluent from said zone which is representative of the composition thereof.

3. Apparatus comprising a column, said column containing a packing material that selectively retards the passage therethrough of the constituents of a vaporous fluid mixture, said packing material comprising a partitioning liquid supported by treated granules, said treated granules consisting of granules prepared from solid polyhalogenated hydrocarbon polymers and contacted with a solution of an alkali metal in liquid ammonia, a first conduit means communicating at the inlet of said column at one end of said packing material, and a second conduit means communicating between said column at the opposite end of said packing material, and a means of measuring a property of the effluent from said column which is representative of the composition thereof.

4. The apparatus of claim 3 wherein said granules are Teflon granules and said solution of an alkali metal in liquid ammonia is a solution of sodium in liquid ammonia.

5. A process of preparing a chromatographic column packing material which comprises contacting granules prepared from solid polyhalogenated hydrocarbon polymers with a solution of an alkali metal in liquid ammonia in a contact zone, withdrawing said solution from said contact zone, passing a solvent to said contact zone to remove residual alkali metal from said granules, drying said granules, and contacting said granules with a partitioning liquid.

6. The process of claim 5 wherein said granules are Teflon granules and said solution comprises a solution of sodium in liquid ammonia.

References Cited in the file of this patent
UNITED STATES PATENTS 3,032,953    Micheletti _____ May 8, 1962

OTHER REFERENCES

"The Quantitative Analysis of Mixtures of Corrosive Halogen Gases by Gas-Liquid Chromatography," by J. F. Ellis et al., Analytica Chimica Acta, vol. 22, 1960, pages 27–33.